(12) United States Patent
Nakazawa et al.

(10) Patent No.: US 9,104,761 B2
(45) Date of Patent: Aug. 11, 2015

(54) DOCUMENT ANALYSIS DEVICE, DOCUMENT ANALYSIS METHOD, AND COMPUTER READABLE RECORDING MEDIUM

(75) Inventors: Satoshi Nakazawa, Tokyo (JP); Shinichi Ando, Tokyo (JP); Yoshio Ishizawa, Tokyo (JP); Yuzuru Okajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 585 days.

(21) Appl. No.: 13/511,918

(22) PCT Filed: Nov. 8, 2010

(86) PCT No.: PCT/JP2010/069788
§ 371 (c)(1),
(2), (4) Date: May 24, 2012

(87) PCT Pub. No.: WO2011/065211
PCT Pub. Date: Jun. 3, 2011

(65) Prior Publication Data
US 2012/0278327 A1 Nov. 1, 2012

(30) Foreign Application Priority Data
Nov. 25, 2009 (JP) .................. 2009-267266

(51) Int. Cl.
*G06F 17/30* (2006.01)

(52) U.S. Cl.
CPC .... *G06F 17/30864* (2013.01); *G06F 17/30696* (2013.01); *G06F 17/30719* (2013.01)

(58) Field of Classification Search
CPC ............... G06F 17/30719; G06F 17/30696; G06F 17/30864; G06F 17/30696

USPC ............ 707/737, 741; 706/45; 715/230, 231, 715/232, 251
See application file for complete search history.

(56) References Cited

U.S. PATENT DOCUMENTS

| 8,438,469 | B1 * | 5/2013 | Scott et al. ................ 715/230 |
| 8,521,674 | B2 * | 8/2013 | Akamine et al. ............ 706/45 |

OTHER PUBLICATIONS

Kenji Tateishi, et al., "Assessment Information Retrieval from the Internet," The Institute of Electronics, Information and Communication Engineers, IEICE technical report, Jul. 2001, NLC 2001-19, pp. 75-82, vol. 101, No. 189.

(Continued)

*Primary Examiner* — Shahid Alam
(74) *Attorney, Agent, or Firm* — Sughrue Mion, PLLC

(57) ABSTRACT

A document analysis device (1) comprises a common assessment information selection unit (90) and an event impact analysis unit (100). The common assessment information selection unit (90) identifies information that matches second assessment information that appears in event-related documents which include descriptions concerning a designated specific event, from among first assessment information that appears in documents for analysis which include descriptions relating to items for analysis, and classifies the information thus identified as common assessment information. The event impact analysis unit (100) counts the number of times the common assessment information appears in the documents that are generated prior to the event occurring, and the number of times the common assessment information appears in the documents for analysis that are generated subsequent to the event occurring, and derives an index that denotes the impact of the specific event upon the documents for analysis, on the basis of the results of the counts thereupon.

21 Claims, 11 Drawing Sheets

(56) References Cited

OTHER PUBLICATIONS

Nozomi Kobayashi, et al., "Collecting Evaluative Expressions by A Text Mining Technique," "Social Interest Group of Natural Language Processing" Research Report, 2003, pp. 9-16, No. 154.

"Kando Report, Usage 3: For measuring the effect of campaigns," [online], NEC BIGLOBE, [retrieved on Sep. 18, 2009], the Internet (URL: <http://kandoreport.jp/work/work.html#level03>).

Tomoyuki Nanno, et al., "Automatically Collecting and Monitoring Japanese Weblogs," Transactions of The Japanese Society of Artificial Intelligence, 2004, pp. 511-520, vol. 19, No. 6.

NEC BIGLOBE, Ltd., Blog Kuchi Komi Bunseki Service 'Kando Report (Kando Report)' no Teikyo o Kaishi, Press Release [online], NEC BIGLOBE, Oct. 31, 2008, [retrival date Nov. 24, 2010], Internet<URL:http://www.biglobe.co.jp/press/2008/1031-1.html>.

Takashi Onishi, et al., "Jikeiretsu Bunseki ni yoru Web Bunsho no Joho Shinraisei Handan Shien: Jikeiretsu karano Juyo Topic no Chushutsu," The Association for Natural Language Processing Dai 15 Kai Nenji Taikai Happyo Ronbunshu, Mar. 2009, pp. 104-107.

Hisako Asano, et al., "Web-jo no Kuchi Komi o Bunseki suru Hyoban Joho Indexing Gijutsu," NTT Gijutsu Journal, Jun. 2008, pp. 12-15, vol. 20, No. 6.

Sadao Kurohashi, et al., Information Credibility Analysis of Web Contents, 2008 Second International Symposium on Universal Communication (ISUC'08) [online], IEEE, Dec. 16, 2008, pp. 146 to 153, [retrieval date Nov. 24, 2010], Internet<URL:http://ieeexplore.ieee.org/stamp/stamp.jsp?tp=&arnumber=4724454>.

Kenji Tateishi, et al., "A Reputation Search Engine from the Internet," IEICE Technical Report, Jul. 2001, [NLC2001-9-21] pp. 75-82, vol. 101, No. 189.

\* cited by examiner

FIG.2 example of extraction result from analysis subject document (steamed dumplings)

| row ID | time information | expressions in document | assessment information ||||
|---|---|---|---|---|---|---|
| | | | evaluation subject | attribute | evaluation expression | classification |
| 1 | 2007/4/7 | I saw something called steamed dumplings and bought it. The texture was kind of new. | steamed dumpling | texture | new | positive |
| 2 | 2007/4/16 | I tried steamed dumplings. The easiness was about the same as similar products, but they tasted quite good. | steamed dumpling | easiness | same | neutral |
| 3 | | <as above> | steamed dumpling | | delicious | positive |
| 4 | 2007/5/2 | ..., but the steamed dumplings are sold in packs of six at that price. They are comparatively expensive, aren't they? | steamed dumpling | price | comparatively expensive | negative |
| | | ... | | | | |
| 10 | 2007/8/4 | Steamed dumplings might be unsuitable for a packed lunch. | steamed dumpling | packed lunch | unsuitable | negative |
| | | ... | | | | |
| 22 | 2007/10/8 | Steamed dumplings might be unsuitable for a packed lunch. | steamed dumpling | | convenient | positive |
| | | ... | | | | |
| 54 | 2007/11/12 | After all, products above a certain price, such as steamed dumplings, are reliable. | steamed dumpling | | reliable | positive |
| | | ... | | | | |
| 87 | 2007/11/20 | I'm going to stick to those products that are easy to prepare but look as authentic as possible, including, for example, ... steamed dumplings, ..., etc. | steamed dumpling | | authentic | positive |
| 88 | 2007/11/20 | These days, I choose products whose ingredients are also home grown, such as steamed dumplings. | steamed dumpling | ingredient(s) | home grown | positive |
| 89 | 2007/11/21 | I like the steamed dumplings more than I expected. | steamed dumpling | | like | positive |

FIG.3 example of extraction result from event-related document (steamed dumplings campaign)

| row ID | time information | expressions in document | assessment information ||||
|---|---|---|---|---|---|---|
| | | | evaluation subject | attribute | evaluation expression | classification |
| 1 | 2007/10/1 | All the dishes looked delicious, making me want to marry Miss A. | dish | | delicious | positive |
| 2 | 2007/10/1 | ...Miss A was doing a good job in the campaign, and she was charming. | Miss A | | charming | positive |
| 3 | 2007/10/2 | The kitchen used in that campaign was wide. | kitchen | | wide | positive |
| 4 | 2007/10/2 | I saw the steamed dumplings commercial, and think that it was in a good style overall. | commercial | style | good | positive |
| | ... | | | | | |
| 8 | 2007/10/3 | The Miss A's kitchen looked expensive, including the interior. I yarn for that honestly. | interior | | expensive | negative |
| | ... | | | | | |
| 22 | 2007/10/8 | ...was surprised at the gorgeous kitchen. She was cooking steamed dumplings, though. | kitchen | | gorgeous | positive |
| | ... | | | | | |

FIG.4 extraction example from event-related document (dumplings country-of-origin mislabeling incident)

| row ID | time information | expressions in document | assessment information ||||
|---|---|---|---|---|---|---|
| | | | evaluation subject | attribute | evaluation expression | classification |
| 1 | 2007/11/10 | ... that means the labeling of the country of origin was all false. The same goes for other food products, doesn't it? | | country of origin | false | negative |
| 2 | 2007/11/11 | It is said that only the steamed dumplings from Company S were found to be authentic by the inspections. It seems the entire industry will go down. | steamed dumpling | | authentic | positive |
| 3 | 2007/11/12 | Processed foods contain many additives, and are unreliable. | processed food | additive | many | negative |
| 4 | | ⟨as above⟩ | processed food | | unreliable | negative |
| | | ... | | | | |
| 8 | 2007/11/14 | You should take note that many of them are manufactured in Japan, but the contents are foreign grown. | | content | foreign grown | negative |
| | | ... | | | | |

FIG.7 comparison before and after the event "steamed dumplings campaign"

| evaluation period | all evaluation expressions | | selected evaluation expressions only | |
|---|---|---|---|---|
| | positive | negative | positive | negative |
| one month up to event | 63 | 11 | 22 | 3 |
| one month after event | 184 | 41 | 47 | 10 |
| difference between pre-event and post-event results (scale factor) | 121 (2.9) | 30 (3.7) | 25 (2.1) | 7 (3.3) | comparison before and after the event "dumplings country-of-origin mislabeling incident"

| evaluation period | all evaluation expressions | | selected evaluation expressions only | |
|---|---|---|---|---|
| | positive | negative | positive | negative |
| one month up to event | 145 | 36 | 5 | 1 |
| one month after event | 110 | 41 | 60 | 20 |
| difference between pre-event and post-event results (scale factor) | −35 (0.8) | 5 (1.1) | 55 (12) | 19 (20) |

DOCUMENT ANALYSIS DEVICE, DOCUMENT ANALYSIS METHOD, AND COMPUTER READABLE RECORDING MEDIUM

CROSS REFERENCE TO RELATED APPLICATION

This application is a National Stage of International Application No. PCT/JP2010/069788 filed Nov. 8, 2010, claiming priority based on Japanese Patent Application No. 2009-267266 filed Nov. 25, 2009, the contents of all of which are incorporated herein by reference in their entirety.

TECHNICAL FIELD

The present invention relates to a document analysis device, a document analysis method, and a computer readable recording medium having recorded thereon a document analyzing program, and particularly to an analysis technique for analyzing, when a document containing a description relating to an analysis subject and information on an event relating to the analysis subject, the impact of the event on the analysis subject.

BACKGROUND ART

These days, there is a need for analysis and evaluation of the impact made by a specific event designated by the user, such as an incident or an advertising campaign, on a subject of interest, for the purpose of marketing, public opinion survey, or the like. For example, let us assume that a user is interested in, as an analysis subject, "dieting effect of product X", and an incident relating to the product X has occurred (e.g., a scandal involving the manufacturer of the product X). In this case, there is a need for measurement by which what impact was made by the incident on a public image and evaluation of the analysis subject "dieting effect of product X" after the incident.

As existing methods for meeting such need, there are conventional technologies using an "assessment information extraction technique". Non-Patent Documents 1 and 2 disclose examples of "assessment information extraction technique". Here, "assessment information extraction technique" refers to a technology for extracting, from a document, an expression (hereinafter, referred to as "assessment information") indicating an evaluation (including a value judgment) described in the document and made by the author of the document. Furthermore, methods for grouping extracted assessment information into expressions indicating a positive evaluation, expressions indicating a neutral evaluation, and expressions indicating a negative evaluation have been published as the assessment information extraction technique.

Additionally, for example, Non-Patent Documents 3 and 4 disclose techniques in which the assessment information extraction technique disclosed in Non-Patent Documents 1 and 2 above is applied to a document set provided with their origination dates, such as blogs on the Internet. According to the techniques disclosed in Non-Patent Documents 3 and 4, assessment information indicating a positive evaluation and assessment information indicating a negative evaluation that appear in the document set are extracted, then the number of appearances of these pieces of assessment information for each origination date is counted, and the temporal transition of the number of appearances is output as a graph or the like.

For example, the user can apply the techniques disclosed in Non-Patent Documents 3 and 4 above to a document containing a description regarding an analysis subject (hereinafter, referred to as an "analysis subject document"), thus visualizing the change of the number of appearances of the assessment information for the analysis subject. Then, the user can analyze the visualized change of the number of appearances of the assessment information, thus carrying out investigation as to what impact that the event of interest has on the public evaluation on a given analysis subject.

Furthermore, if the user knows the date of the event of interest, the user can understand the increase and decrease in the amount of the positive assessment information or the negative assessment information contained in the analysis subject documents after that date, from the change in the number of appearances of the visualized assessment information. Specifically, to put it simply, if the amount of the positive assessment information has increased after the event, the user can judge that the evaluation on the analysis subject has changed in a favorable direction by that event. Conversely, if the amount of the negative assessment information has increased after the event, the user can judge that the evaluation on the analysis subject has changed in an unfavorable direction by that event. Additionally, the amount of increase in the positive assessment information or the negative assessment information indicates the magnitude of impact of the event. Thus, the user can judge, for example, the magnitude of impact and the direction of impact of the event, using the techniques disclosed in Non-Patent Documents 3 and 4.

CITATION LIST

Non-Patent Document

Non-Patent Document 1: Kenji Tateishi, Yoshihide Ishiguro, Toshikazu Fukushima, "Assessment Information Retrieval from the Internet", The Institute of Electronics, Information and Communication Engineers, IEICE technical report, July 2001, NLC 2001-19, pp. 75-82

Non-Patent Document 2: Nozomi Kobayashi, Kentaro Inui, Yuji Matsumoto, Kenji Tateishi, Toshikazu Fukushima, "Collecting Evaluative Expressions by A Text Mining Technique", "Social Interest Group of Natural Language Processing" Research Report, 2003, No. 154, p. 9-16

Non-Patent Document 3: "Kando Report, Usage 3: For measuring the effect of campaigns", [online], NEC BIGLOBE, [retrieved on 2009-09-18], the Internet (URL: <http://kandoreport.jp/work/work.html#level03>)

Non-Patent Document 4: Tomoyuki Nanno, Yasuhiro Suzuki, Toshiaki Fujiki, Manabu Okumura, "Automatically Collecting and Monitoring Japanese Weblogs", Transactions of The Japanese Society of Artificial Intelligence, 2004, Vol. 19, No. 6, pp. 511-520

DISCLOSURE OF THE INVENTION

Problem to be Solved By the Invention

As described above, the use of the techniques disclosed in Non-Patent Documents 3 and 4 above allows the user performing analysis to understand the impact of the event by comparing the number of appearances of the assessment information extracted from analysis subject documents originated (created) after the occurrence of the event with the number of appearances of the assessment information before the occurrence of the event. However, not only the assessment information relating to the analysis subject that has resulted from the occurrence of the event of interest, but also assessment information different therefrom is included in the extracted assessment information. Therefore, the techniques disclosed in Non-Patent Documents 3 and 4 have the problem that the user cannot accurately understand the impact of the event.

One cause of the above-described problem is that even if analysis subject documents were created during a period of time not so late from the event, not all the documents are created under the impact of that event. In the case of using such documents, assessment information irrelevant to the event of interest (relating to another event in some instances) is extracted, and as a result, such assessment information is counted into the amount of increase or decrease of the assessment information after the event. Further, assessment information relating to another event may be counted not only into the counting results obtained after the occurrence of the event of interest, but also into the counting results obtained before the occurrence of the event in the same manner.

Another cause of the above-described problem is that even if an analysis subject document has been created, triggered by the event of interest, not only descriptions relating to the analysis subject, but also many descriptions and feedbacks relating to the event itself are present in such document. When an analysis subject document contains many descriptions relating to items other than the analysis subject, not only the assessment information relating to the analysis subject, but also the assessment information or the like for the event are included in the assessment information.

Moreover, with the above-described problem, the closer the period during which the analysis subject document is created to the period immediately after the event, the stronger the impact of the inclusion caused by the latter reason. On the other hand, if the analysis subject document is created after a certain period of time has passed from the time of occurrence of the event, the impact of the former reason is stronger since the probability that the above-described assessment information including assessment information irrelevant to the event is extracted is higher.

A specific example of the above-described problem will now be described. For example, let us assume that the user wishes to measure the impact of the event "celebrity T performed a trial campaign for product X in Yoyogi Park in October", taking "dieting effect of product X" as the analysis subject. In this case, documents that contain the keywords "product X", "diet", and "effect" that have been created during a three-month period before and after October, in which the event took place, are collected as analysis subject documents. Also, it is conceivable to examine how the number of appearances of the assessment information in and after October has increased or decreased, using the techniques disclosed in Non-Patent Documents 3 and 4 above.

However, the documents created, triggered by the event, contain assessment information that relate only to the event, but does not directly relate to the analysis subject, including, for example, "Yoyogi Park was wide and nice", "I was irritated by the inefficient way of handing out the product", and "The real miss T was charming", "Miss T looked sophisticated, so did the necklace she was wearing". It is therefore evident that analyzing the increase or decrease including the assessment information appearing these documents is inappropriate to the purpose of measuring the impact of the analysis subject.

Let us also assume that, shortly after the event of interest, another event (hereinafter, referred to as "price-increase event") has incidentally occurred in which the price of the product X has been increased in a large-scale retail store. As a result, in analysis subject documents created after the occurrence of the price-increase event, negative assessment information for the product X, such as "I was shocked at the price increase" and "I became less inclined to buy the product", increases. In the case of using the techniques disclosed in Non-Patent Documents 3 and 4 above, such results are also observed as results obtained after the event. However, such results do not indicate the impact of the event of interest on the analysis subject.

It is an object of the present invention to solve the above-described problems and provide a document analysis device, a document analysis method, and a computer readable recording medium with which it is possible to accurately analyze the impact on an analysis subject document made by a specific event.

Means for Solving the Problem

A document analysis device according to the present invention for achieving the foregoing object is a document analysis device for analyzing an impact of a specific event on an analysis subject, including:

a common assessment information selection unit that identifies, from among first assessment information appearing in an analysis subject document containing a description relating to an analysis subject, information that matches second assessment information appearing in an event-related document containing a description relating to the designated event, and selecting the identified information as common assessment information; and an event impact analysis unit that separately counts the number of times that the common assessment information appears in the analysis subject document created before the occurrence of the event and the number of times that the common assessment information appears in the analysis subject document created after the occurrence of the event, and deriving an index representing the impact based on results of the counting.

Further, a document analysis method according to the present invention for achieving the foregoing object is a method for analyzing an impact of a specific event on an analysis subject, including the steps of:

(a) identifying, from among first assessment information appearing in an analysis subject document containing a description relating to an analysis subject, information that matches second assessment information appearing in an event-related document containing a description relating to the designated event, and selecting the identified information as common assessment information; and (b) separately counting the number of times that the common assessment information appears in the analysis subject document created before the occurrence of the event and the number of times that the common assessment information appears in the analysis subject document created after the occurrence of the event, and deriving an index representing the impact based on results of the counting.

Furthermore, a computer readable recording medium according to the present invention for achieving the foregoing object is a computer readable recording medium having recorded thereon a program for analyzing, with a computer, an impact of a specific event on an analysis subject, the program including instructions for causing the computer to execute the steps of:

(a) identifying, from among first assessment information appearing in an analysis subject document containing a description relating to an analysis subject, information that matches second assessment information appearing in an event-related document containing a description relating to the designated event, and selecting the identified information as common assessment information; and (b) separately counting the number of times that the common assessment information appears in the analysis subject document created before the occurrence of the event and the number of times that the common assessment information appears in the analysis subject document created after the occurrence of the event, and deriving an index representing the impact based on results of the counting.

Effects of the Invention

With the document analysis device, the document analysis method, and the computer readable recording medium according to the present invention, it is possible to accurately analyze the impact on an analysis subject document made by a specific event.

BRIEF DESCRIPTION OF THE DRAWINGS

FIG. 2 is a table showing an example of first assessment information extracted from analysis subject documents.

FIG. 3 is a table showing an example of second assessment information extracted from event-related documents (Extraction Example 1).

FIG. 4 is a table showing another example of the second assessment information extracted from event-related documents (Extraction Example 2).

FIG. 7 shows an example of results of analysis performed by a document analysis device according to an embodiment of the present invention.

BEST MODE FOR CARRYING OUT THE INVENTION

Embodiment

Figure 1:
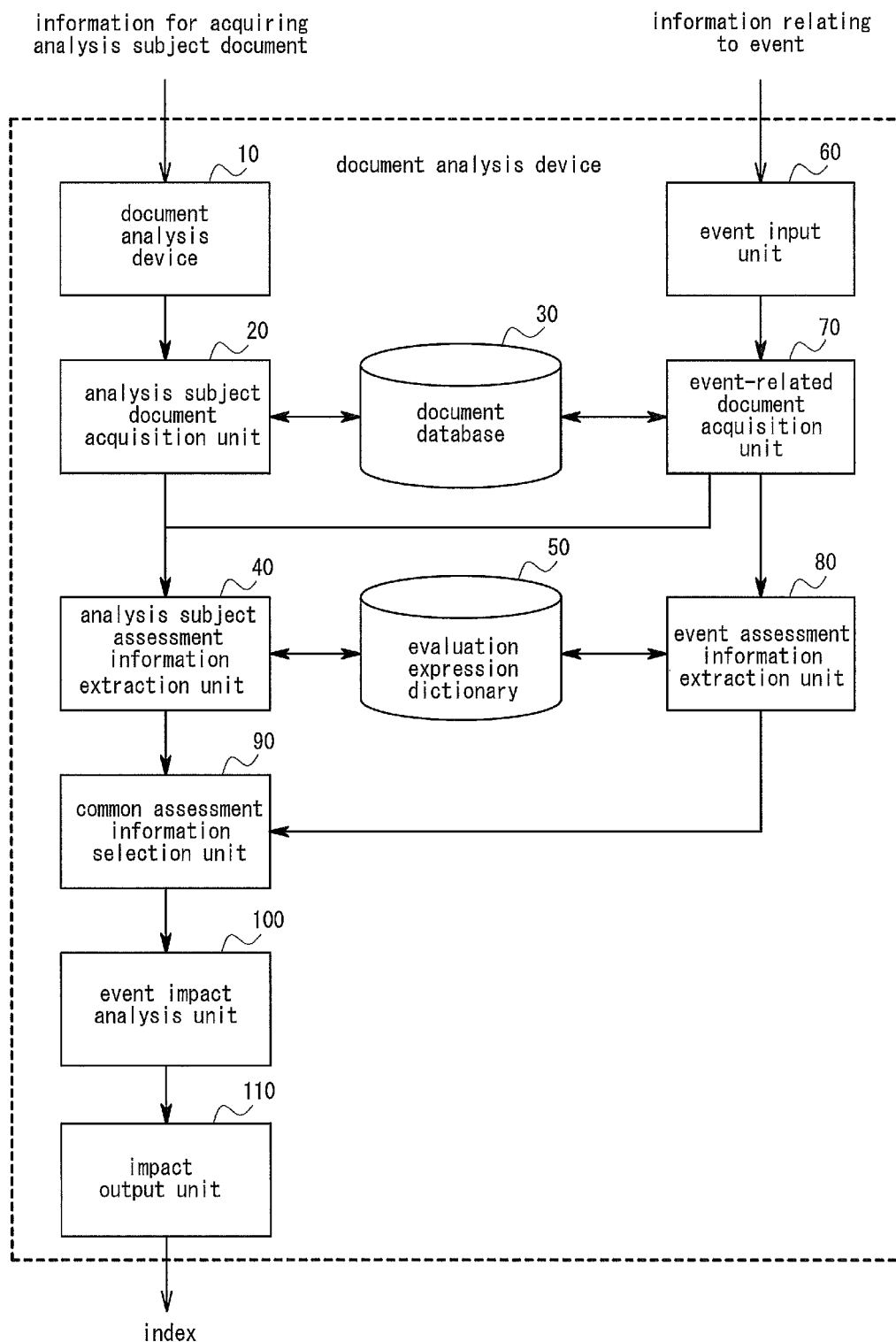
FIG. 1 is a block diagram showing the configuration of a document analysis device according to an embodiment of the present invention.

Hereinafter, a document analysis device, a document analysis method, and a program according to an embodiment of the present invention will be described with reference to FIGS. 1 to 10. First, the configuration of a document analysis device 1 of this embodiment will be described with reference to FIG. 1. FIG. 1 is a block diagram showing the configuration of the document analysis device according to an embodiment of the present invention.

The document analysis device 1 of this embodiment shown in FIG. 1 is a device for analyzing the impact of a specific event on an analysis subject. As shown in FIG. 1, the document analysis device 1 includes a common assessment information selection unit 90 and an event impact analysis unit 100. The common assessment information selection unit 90 identifies, from among first assessment information, information that matches second assessment information, and selects the identified information as common assessment information.

Here, the first assessment information (hereinafter, referred to as "analysis subject assessment information") refers to information appearing in an analysis subject document containing a description relating to an analysis subject. In this embodiment, the analysis subject assessment information includes an evaluation made by the author contained in the analysis subject document. The second assessment information (hereinafter, referred to as "event assessment information") refers to information that appears in an event-related document containing a description relating to a designated specific event. In this embodiment, the event assessment information includes an evaluation made by the author contained in the event-related document. Note that evaluations made by the author include a value judgment made by the author.

The event impact analysis unit 100 counts the number of times that the common assessment information appears in analysis subject documents created before the occurrence of the event and the number of times that the common assessment information appears in analysis subject documents created after the occurrence of the event. Based on results of the counting, the event impact analysis unit 100 derives an index representing the impact of the specific event on the analysis subject.

In this way, the document analysis device 1 selects, from the analysis subject assessment information and the event assessment information, common assessment information commonly appearing in both the analysis subject documents and the event-related documents, and counts the number of times that the common assessment information appears in the analysis subject documents before and after the event, focusing only on the common assessment information. Therefore, assessment information that has been generated due to any other event, assessment information that relates to the event itself but does not relate to the evaluation and assessment of the analysis subject, and the like are excluded from the counting. Accordingly, with the document analysis device 1, the user can accurately analyze the impact received by the evaluation of the analysis subject documents from the event, using such counting results.

The configuration of the document analysis device 1 will now be described in further detail with reference to FIGS. 2 to 7 in addition to FIG. 1. As shown in FIG. 1, in this embodiment, the document analysis device 1 includes, in addition to the common assessment information selection unit 90 and the event impact analysis unit 100, an analysis subject input unit 10, an analysis subject document acquisition unit 20, a document database 30, an analysis subject assessment information extraction unit 40, an evaluation expression dictionary 50, an event input unit 60, an event-related document acquisition unit 70, an event assessment information extraction unit 80, and an impact output unit 110.

The analysis subject input unit 10 accepts conditions for acquiring analysis subject documents as an input. The analysis subject document acquisition unit 20 acquires the analysis subject documents from the document database 30 in accordance with the conditions that have been input. The document database 30 stores a large quantity of documents from which the analysis subject document acquisition unit 20 acquires the analysis subject documents. The analysis subject assessment information extraction unit 40 extracts analysis subject assessment information from the analysis subject documents, using the evaluation expression dictionary 50. The evaluation expression dictionary 50 stores expressions that are used for extracting the analysis subject assessment information.

The event input unit 60 accepts, as an input, information defining an event in which the user is interested. The event-related document acquisition unit 70 acquires event-related documents from the document database 30 in accordance with the event information that has been input into the event input unit 60. The event assessment information extraction unit 80 extracts the event assessment information from the event-related documents. The impact output unit 110 outputs the index derived by the event impact analysis unit 100. In the following, each of these units will be described in further detail.

The analysis subject input unit 10 can accept, as an input, information relating to matters and viewpoints that the user using the document analysis device 1 of this embodiment wishes to use as the analysis subject, in the form of a search condition defining the analysis subject document acquired by the analysis subject document acquisition unit 20 described below. Additionally, on the assumption that the user has selected appropriate conditions for document selection, the analysis subject input unit 10 accepts the conditions that have been input, and transfers the accepted conditions to the analysis subject document acquisition unit 20 described below.

For example, let us now assume that the user wishes to analyze the evaluation and image of "dieting effect of product X" that homemakers have. For this purpose, the user inputs a search keyword with "AND" condition such as "product X", "diet", and "effect", and conditions for selecting documents, such as "document search subject: blogs in which "homemaker" is described in the originator's profile field". What document selection conditions into which the analysis purpose of the user is to be converted is left to the user's discretion.

The conditions that can be accepted by the analysis subject input unit 10 as an input may be any search conditions defining the analysis subject document, and may be in any format. Examples of the conditions include search keywords with "AND" condition, search keywords with "OR" condition, keywords co-occurring with search keywords, keywords for searching similar documents, time conditions such as ranges of document origination dates, conditions for identifying a document population for which document search is performed, and conditions for identifying document originators or authors. In this embodiment, these document search conditions that have been published as existing techniques can be used. In this embodiment, among these existing document search conditions, conditions corresponding to the application or purpose intended by the user have been previously set for the analysis subject input unit 10.

The following is another example of the conditions that can be accepted by the analysis subject input unit 10 as an input. The following example is based on the assumption that the need exists to analyze "assessments of general consumers on "steamed dumplings" that Company S has started selling on Apr. 1, 2007". In this example, the user inputs, as search conditions, the search keyword "steamed dumplings", the origination date condition "in or after Apr. 1, 2007", and the document search subject condition "blogs in which not more than a given number of affiliate advertisements are present in the blog sites of the same originator".

Examples of the input means (not shown) for inputting the conditions into the analysis subject input unit 10 include input devices such as a keyboard and a mouse, and another device (computer) connected to the document analysis device 1 via a network. The user appropriately selects the optimum means from these input means for use.

The analysis subject document acquisition unit 20 accepts conditions for the analysis subject document that have been input into the analysis subject input unit 10, performs a document search from the document database 30 described below according to the accepted conditions, and acquires documents satisfying the conditions. Additionally, the analysis subject document acquisition unit 20 outputs the acquired documents to the analysis subject assessment information extraction unit 40 as "analysis subject documents" containing descriptions relating to the analysis subject. Note that this embodiment adopts a configuration in which the conditions for searching for the analysis subject document are input into the analysis subject input unit 10, and the analysis subject documents are acquired by the analysis subject document acquisition unit 20 in accordance with the input search conditions. However, this embodiment does not necessarily adopt such a configuration, and may also adopt a configuration in which the user using the document analysis device 1 directly inputs the analysis subject documents into the document analysis device 1.

The document database 30 is a database that stores, in a searchable state, a document set serving as a population for acquiring the analysis subject documents and the event-related documents. There is no particular limitation with respect specific examples of a document set stored in the document database 30, and may be appropriately selected according to the application or purpose in the use of the document analysis device 1. Further, many documents have been previously stored in the document database 30 such that a sufficient number of analysis subject documents and event-related documents are present.

In this embodiment, the document analysis device 1 may not include the document database 30, and a document database installed externally via the Internet or the like may used instead. Furthermore, the external document database may be a database that can be used with a commonly used document search service published on the Internet. In this case, a document set serving as the population is stored in the externally installed document database. Further, in this case, the document analysis device 1 includes an interface for performing a document search from the external document database Additionally, it is preferable that time information such as a document origination time, including, for example, a blog origination date, a document creation period, or a document update time is added to documents that are output from the document database 30 to the analysis subject document acquisition unit 20 and the event-related document acquisition unit 70 described below. Specific accuracy and granularity with which time information is added to each document are determined by the population of the stored documents. The "granularity" refers to the degree of fineness of the time unit added, including, for example, in units of months, in units of weeks, units of hours.

The analysis subject assessment information extraction unit 40 extracts, from the analysis subject documents acquired by the analysis subject document acquisition unit 20, portions describing an evaluation made by the author of each of the analysis subject documents as analysis subject assessment information, using the evaluation expression dictionary 50 described below. A specific extraction of the analysis subject assessment information performed by the analysis subject assessment information extraction unit 40 is carried out, for example, using the exiting assessment information extraction technique disclosed in Non-Patent Documents 1 and 2 described above.

One specific example is a technique by which expressions containing general evaluations made by humans are previously defined as evaluation expressions, and then an expression matching any of the predefined evaluation expressions and an expression modifying the expression in the neighborhood of that expression are extracted from the analysis subject documents.

When extracting the analysis subject assessment information from the analysis subject documents using the assessment information extraction technique, it is not necessary to extract the analysis subject assessment information from all the documents belonging to the extract analysis subject documents. In this embodiment, it is also possible to perform the analysis subject assessment information extraction after excluding documents belonging to both the analysis subject document and the event-related document from the analysis subject assessment information that is to be extracted.

The reason why documents belonging to both of the document sets are excluded is that the analysis subject assessment information extraction unit 40 is not intended to extract the assessment information relating to the event, but is purely intended to extract the assessment information in which an evaluation is made for the analysis subject. However, when it is estimated that the number of documents belonging to both the analysis subject documents and the event-related documents is small, such extraction process may be omitted.

Furthermore, in this embodiment, it is not necessary to extract the assessment information from all texts of each of the documents belonging to the analysis subject documents when a search keyword defining the analysis subject has been input from the analysis subject input unit 10. In this case, the analysis subject assessment information may be extracted only from a neighboring text located at a certain distance from the search keyword defining the analysis subject that appears in the document or from an expression modifying the search keyword defining the analysis subject. By performing such limitation of the texts that are to be extracted, it is possible to reduce the possibility that assessment information included in the analysis subject document but having low relevance to the analysis subject is erroneously extracted.

A specific example of a case where the analysis subject assessment information has been extracted from the analysis subject document will now be described with reference to FIG. 2. FIG. 2 is a table showing an example of the first assessment information (analysis subject assessment information) extracted from the analysis subject documents. The example shown in FIG. 2 is based on the assumption that the need exists to analyze "assessments of general consumers on "steamed dumplings" that Company S has started selling on Apr. 1, 2007". In this example, the user inputs, into the analysis subject input unit 10, the search keyword "steamed dumplings", the origination date condition "in or after Apr. 1, 2007", and the document search subject condition "blogs in which not more than a given number of affiliate advertisements are present in the blog sites of the same originator" as search conditions. Thereby, the analysis subject document acquisition unit 20 acquires blog documents that satisfy the above-described search conditions using blog sites available to the public as a document population, and outputs the blog documents as the analysis subject documents.

Then, as shown in FIG. 2, a single piece of the assessment information extracted from this analysis subject document is described in a single row. In FIG. 2, "row ID" is an ID for differentiating between the extracted assessment information pieces. "Time information" is time information added to documents from which the individual pieces of assessment information have been extracted. The time information is handled as time information of the individual pieces of extracted assessment information. Further, the column "expressions in document" in FIG. 2 indicates a portion that is included in each analysis subject document and that describes an evaluation made by the author of that document.

Furthermore, as shown in FIG. 2, the analysis subject assessment information includes, as its elements, the subject that is to be evaluated by the author (hereinafter, referred to as "evaluation subject"), the attribute of the evaluation, the expression representing the evaluation (hereinafter, referred to as "evaluation expression"), and the classification of the evaluation. More specifically, in the example shown in FIG. 2, a text in a portion describing an evaluation made by the author of the document is structured and formatted into "assessment information" composed of the four categories "evaluation subject", "attribute", "evaluation expression", and "classification".

Here, "evaluation subject" refers to a subject indicated by an evaluation made by the author of the document, as described above. Further, when an evaluation made by the document author is described with regard to a particular property of the evaluation subject, the property corresponds to "attribute". Examples of "attribute" include descriptions regarding the "function" of the evaluation subject, descriptions regarding the "outer appearance" of the evaluation subject, and descriptions regarding the "price" of the evaluation subject.

"Evaluation expression" refers to a minimal expression representing an evaluation made by the document author. In many cases, the evaluation expression is composed of a single adjective or adjective verb. Examples of "evaluation expression" include "emotional" expressions and "quantitative" expressions. "Classification" refers to a result of classifying the extracted analysis subject assessment information into several groups. In the example shown in FIG. 2, each analysis subject assessment information is classified as one of the three groups "positive" assessment, "negative" assessment, and "neutral" assessment, based on its content.

Furthermore, the division into groups may also be performed based on an arbitrary criterion such as a combination of "attribute" and "evaluation expression" of the assessment information, the type of the evaluation expression, and the degree of intensity or severity of the evaluation expression.

As described below, in this embodiment, the event impact analysis unit 100 can count the assessment information for each group that constitutes "classification". When a simple investigation of the increase or decrease of the assessment information is only required as an analysis of the impact of an event on the analysis subject, the assessment information does not need to be classified as shown in FIG. 2. In this case, the analysis subject assessment information may be gathered into a single group.

In general, there are an infinite number of variations of expressions in a raw text in a portion that is included in an analysis subject document and describes an evaluation made by the document author. Therefore, it is not easy to differentiate such a portion from a portion describing a different evaluation, or determine that the same content is described. For this reason, in this embodiment, as shown in FIG. 2, an original text describing an evaluation is structured into a unified format, and determination of the difference or sameness is performed for "assessment information" created from this structurization. Specifically, in the example shown in FIG. 2, "assessment information" is composed of the four categories "evaluation subject", "attribute", "evaluation expression", and "classification" as described above.

Examples of the means for structurizing texts included in analysis subject documents to create "assessment information" include the existing assessment information extraction technique that has been published. For example, Non-Patent Document 2 above discloses a technique for structuring texts by classifying them into the three categories "evaluation subject", "attribute", and "evaluation expression". Also, Non-Patent Document 1 above discloses a technique for dividing the assessment information into either a "positive" group or a "negative" group.

Note that the structure of "assessment information" used in this embodiment is not limited to the structure shown in the example in FIG. 2, and any structure may be adopted according to the application or purpose in the use of the document analysis device 1 of this embodiment. The structure of the assessment information may be previously defined. Examples of the technique for structurizing a text in a portion describing an evaluation made by the author in a document, into a format for being handled as the assessment information include a syntactic analysis technique and an information extraction technique used in the natural language processing technology The evaluation expression dictionary 50 is a dictionary used by the analysis subject assessment information extraction unit 40 and the event assessment information extraction unit 80 described below, and has recorded thereon evaluation expressions used by these units when extracting the assessment information. The content of the evaluation expression dictionary 50 is set so as to correspond to a specific means used in the assessment information extraction technique used in the analysis subject assessment information extraction unit 40 and the event assessment information extraction unit 80.

Note that when no evaluation expression dictionary is used in the assessment information extraction technique used by the analysis subject assessment information extraction unit 40 and the event assessment information extraction unit 80, the document analysis device 1 does not include the evaluation expression dictionary 50.

The event input unit 60 can accept, as an input, information relating to an event in which the user using the document analysis device 1 of this embodiment is interested, in the form of search conditions defining the event-related document acquired by the event-related document acquisition unit 70 described below. Furthermore, the event input unit 60 can also accept, as an input, the occurrence time of the event, separately from the search conditions defining the event-related document. The accepted occurrence time of the event is used by the event impact analysis unit 100 described below for differentiating between the analysis subject documents created before the occurrence of the event and the analysis subject documents created after the occurrence of the event.

For example, let us assume that the user is interested in "steamed dumplings sales promotion campaign carried out from Oct. 1, 2007 to Oct. 14, 2007 using the celebrity Miss A" as an event that might have an impact on the documents relating to "steamed dumplings", which were the analysis subject documents in the example in FIG. 2. In the following description, this exemplary event is referred to as "steamed dumplings campaign".

The user inputs, into the event input unit 60, for example, the search keyword "steamed dumplings campaign" or "Miss A AND campaign" and the document origination date range "Oct. 1, 2007 to Oct. 14, 2007" as the search conditions defining a document relating to this event. The user also inputs the event occurrence time "Oct. 1, 2007" into the event input unit 60.

Let us also assume that the user is similarly interested in "report that the country of origin of the pork used as the material of frozen dumplings manufactured by several manufacturers was mislabeled and additives were included in the pork (reported on: Nov. 10, 2007)" and "report that as an exceptional case in the industry, no mislabeling was found for the steamed dumplings manufactured by company S" as another exemplary events that might have an impact on documents relating to "steamed dumplings", which were used as the analysis subject documents in the example in FIG. 2. In the following description, the exemplary event in which these two reports are combined is referred to as "dumplings country-of-origin mislabeling incident".

For example, the user inputs, into the event input unit 60, the search keyword "dumplings AND country-of-origin mislabeling" or "dumplings AND additive inclusion" and the document origination date range "documents originated on and after Nov. 10, 2007" as the search conditions defining a document relating to this event. The user also inputs the event occurrence time "Nov. 10, 2007" into the event input unit 60.

Examples of the input means (not shown) for inputting the conditions into the event input unit 60 include input devices such as a keyboard and a mouse, and another device (computer) connected to the document analysis device 1 via a network. The user appropriately selects an optimum means from these input means for use.

The event-related document acquisition unit 70 accepts conditions for a document relating to the event that have been input into the event input unit 60, performs a document search from the document database 30 in accordance with the accepted conditions, and acquires documents satisfying the conditions. Also, the event-related document acquisition unit 70 outputs the acquired documents as "event-related documents" to the event assessment information extraction unit 80. Note that this embodiment adopts a configuration in which conditions for searching a document relating to the event are taken as an input into the event input unit 60, and the event-related document acquisition unit 70 acquires the event-related documents in accordance with the search conditions that have been input. However, this embodiment does not need to adopt this configuration, and can also adopt a configuration in which the user using the document analysis device 1 directly inputs the event-related documents and the event occurrence time into the document analysis device 1.

The event assessment information extraction unit 80 extracts, from the event-related documents acquired by the event-related document acquisition unit 70, portions describing an evaluation made by the author of each of the event-related documents as the event assessment information, using the evaluation expression dictionary 50. A specific extraction of the event assessment information performed by the event assessment information extraction unit 80 is carried out, for example, using the exiting assessment information extraction technique disclosed in Non-Patent Documents 1 and 2 described above. Note that, in this embodiment, the existing assessment information extraction technique is identical to the assessment information extraction technique used in the analysis subject assessment information extraction unit 40.

In this embodiment, it is not necessary to extract the assessment information from all texts of each of the documents belonging to the event-related documents when a search keyword defining the event-related documents has been input from the event input unit 60. In this case, the event assessment information may be extracted only from a neighboring text located at a certain distance from the search keyword defining the event-related documents that appears in the document or from an expression modifying the search keyword defining the event-related documents. By performing such limitation of the texts that are to be extracted, it is possible to reduce the possibility that assessment information included in the event-related documents but having low relevance to the event is erroneously extracted.

A specific example of a case where the event assessment information has been extracted from the event-related documents will now be described with reference to FIGS. 3 and 4. FIG. 3 is a table showing an example (Extraction Example 1) of the second assessment information (event assessment information) extracted from the event-related documents. FIG. 4 is a table showing another example (Extraction Example 2) of the second assessment information (event assessment information) extracted from the event-related documents.

In the example shown in FIG. 3, the search conditions for the event "steamed dumplings campaign" covered in the description of the event input unit 60 are used. FIG. 3 shows an example of the event assessment information extracted from the event-related documents acquired by the event-related document acquisition unit 70, using blogs available to the public as a document population. Note that "row" and "column" in FIG. 3 mean the same as "row" and "column" in FIG. 2.

In the example shown in FIG. 4, the search conditions for the event "dumplings country-of-origin mislabeling incident" that have been covered in the description of the event input unit 60 are used. FIG. 4 also shows an example of the assessment information extracted by the event-related document acquisition unit 70 from the event-related documents acquired using blogs open to the public as a population. Note that "row" and "column" in FIG. 4 also mean the same as "row" and "column" in FIG. 2.

The common assessment information selection unit 90 receives the analysis subject assessment information extracted by the analysis subject assessment information extraction unit 40 as a first assessment information extraction result, and receives the event assessment information extracted by the event assessment information extraction unit 80 as a second assessment information extraction result.

Then, the common assessment information selection unit 90 selects, from the analysis subject assessment information included in the first assessment information extraction result, information matching the event assessment information included in the second assessment information extraction result as common assessment information.

Although the extraction of the assessment information and the input into the common assessment information selection unit 90 are performed by the analysis subject assessment information extraction unit 40 and the event assessment information extraction unit 80 in the example shown in FIG. 1, this embodiment is not limited to this configuration. When the user separately provides the first assessment information extraction result and the second assessment information extraction result, the document analysis device 1 of this embodiment may have a configuration in which these results are directly input into the common assessment information selection unit 90. Note, however, that the process executed by the common assessment information selection unit 90, and the event impact analysis unit 100 and the impact output unit 110 described below is the same regardless of whether the user directly inputs the first assessment information extraction result and the second assessment information extraction result.

As described above, the common assessment information selection unit 90 determines a match between the assessment information and another assessment information (a match between the analysis subject assessment information and the event assessment information). At that time, in this embodiment, the pieces of the structured assessment information are compared, and it is determined that two pieces of assessment information if part of the structured elements or all the structured elements match. In the following, the determination of a match between pieces of the assessment information will be described.

When extracted from the original text, each assessment information is structured by the analysis subject assessment information extraction unit 40 and the event assessment information extraction unit 80 so as to include several elements constituting the assessment information. In the example in FIG. 2, a portion describing an evaluation made by the document author is structured into four categories (evaluation subject, attribute, evaluation expression, classification) and the assessment information includes "evaluation subject", "attribute", "evaluation expression", and "classification" as its elements.

The rule specifying the elements constituting the assessment information between which a match needs to occur to determine that the two pieces of assessment information match can be previously defined in accordance with the specific content of assessment information extraction technique used by the analysis subject assessment information extraction unit 40 and the event assessment information extraction unit 80.

For example, in the examples shown in FIGS. 2 to 4, the contents of only "evaluation expression" of the elements constituting the pieces of the assessment information match each other, it can be determined that the pieces of the assessment information also match. Note that, in this case, it is preferable that the determination is carried out after performing normalization of conjugated words for "evaluation expression", as will be described below. In addition to this, it is also possible to determine pieces of the assessment information match if the contents of both "attribute" and "evaluation expression" match, the contents of only "attribute" match, or the contents of the three groups "evaluation subject", "attribute", and "evaluation expression" match.

The stricter the condition for matching, the lower the possibility that the pieces of assessment information that have different contents of assessment and different evaluation standpoints are erroneously regarded as matching. However, on the other hand, due to the problem of data sparseness, an increase in the strictness of the condition results in that almost no matching pieces of assessment information are selected. Therefore, the matching condition needs to be set such that matching pieces of assessment information are selected based on the estimated amount of the analysis subject documents and the event-related documents in the use of the document analysis device 1.

Usually, the event-related documents contain assessment information relating to the event itself, assessment information relating to both the event and the analysis subject, and also assessment information irrelevant to both of them. For example, in the example of the assessment information extraction result shown in FIG. 3, the pieces of assessment information in rows ID2, ID3, ID4, ID8, and ID22 describe impressions and evaluations of viewers who watched a commercial or the like of the steamed dumplings campaign on that commercial.

While there is the possibility that the pieces of assessment information in the row ID2, ID3, ID4, ID8, and ID22 increase the recognition of the steamed dumplings, these pieces of assessment information directly are pieces of assessment information relating to the event itself. Therefore, it cannot be considered that these pieces of assessment information have had a good impact on the public evaluation on the steamed dumplings. Also, "evaluation subject", "attribute", and "evaluation expression" included in these pieces of assessment information indicate impressions and evaluations on Miss A, the kitchen shown during the commercial and so forth that have resulted from the event. Accordingly, "evaluation subject", "attribute", and "evaluation expression" included in these pieces of assessment information do not match "evaluation subject", "attribute", and "evaluation expression" usually included in the assessment information that evaluates the steamed dumplings, except when they lexically match by accident.

By this matching determination process, the common assessment information selection unit 90 selects assessment information that is common to the analysis subject assessment information extracted by the analysis subject documents and the event assessment information extracted from the event-related documents. Consequently, any assessment information that relates to the event itself but does not correspond to a direct assessment of the analysis subject is excluded.

Further, the analysis subject assessment information extracted from the analysis subject documents includes assessment information irrelevant to the event of interest. For instance, it seems that the row ID54 and ID88 shown in the example in FIG. 2 are pieces of assessment information that have been described under the impact of the dumplings country-of-origin mislabeling incident, not the steamed dumplings campaign event.

Let us assume that the user now wishes to know the degree of impact of the steamed dumplings campaign on the evaluations of the steamed dumplings for the purpose of measuring the effect of the steamed dumplings campaign. In this case, pieces of assessment information such as the row ID54 and ID88 shown in the example in FIG. 2 need to be excluded even if they are positive assessments on the steamed dumplings. In this embodiment, these pieces of assessment information irrelevant to the event of interest are excluded by the common assessment information selection unit 90 selecting assessment information (common assessment information) that is common to the analysis subject assessment information extracted from the analysis subject document and the event assessment information extracted from the event-related document of interest.

Figure 5:
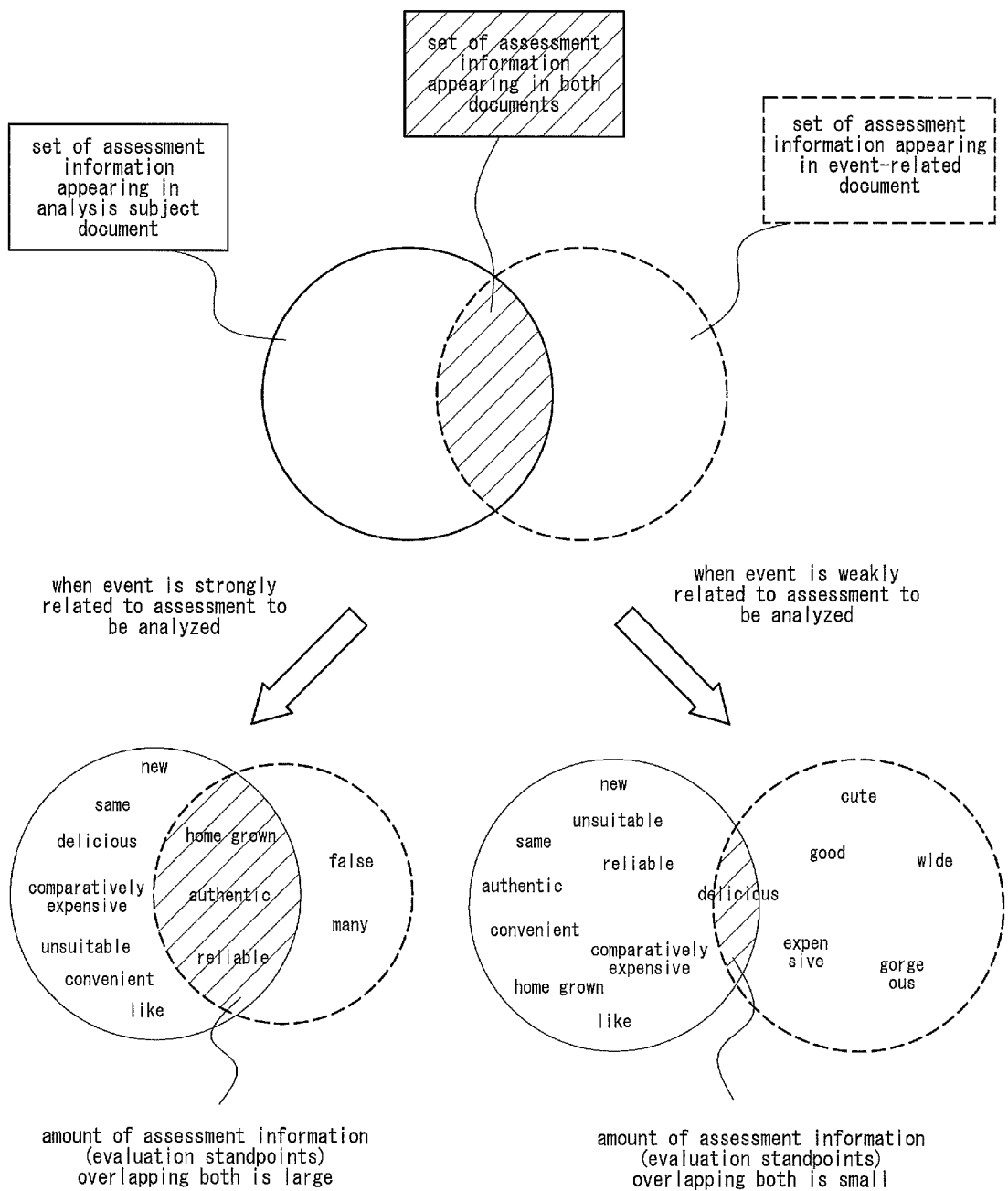
FIG. 5 is a schematic diagram conceptually showing the overlap between the first assessment information extracted from the analysis subject documents and the second assessment information extracted from the event-related documents.

The effect achieved by selecting these common pieces of assessment information will now be described with reference to FIG. 5. FIG. 5 is a schematic diagram conceptually showing the overlap between the first assessment information extracted from the analysis subject documents and the second assessment information extracted from the event-related documents.

As shown in FIG. 5, it seems that there are many pieces of common assessment information when the event of interest is strongly related to the assessment of the analysis subject, or in other words, when evaluations and assessments that were originally described with regard to the analysis subject are commonly described also during the event. One conceivable example of this case is that evaluations and assessments are described more increasingly (or more decreasingly) after the event in analysis subject documents independent of the event. Another conceivable case is that evaluations and assessments that had not been described with regard to the analysis subject before the event have been newly established by being covered by the event, and thus has started being described also in analysis subject documents independent of the event after the event. The common assessment information can be used for these cases.

Specifically, it is conceivable that evaluations from the standpoint of whether the country of origin is "authentic" or evaluations from the standpoint of whether the product is "reliable", which have not been often described in the past, start appearing in analysis subject documents relating to steamed dumplings as a result of the dumplings country-of-origin mislabeling incident shown in FIG. 4. Also, pieces of assessment information such as "authentic" or "reliable" (to be precise, in this example, "evaluation expression", which is an element of the assessment information used as the matching condition) commonly appear in the event-related document and analysis subject documents that have been created after the occurrence of the event and are not directly related to the event. On the other hand, as shown in FIG. 5, when the event of interest is weakly related to assessments of the analysis subject, the amount of the assessment information commonly described in the event-related documents and the analysis subject documents is small.

Furthermore, when determining whether pieces of assessment information match, it is preferable to make the determination by checking whether the standpoints of evaluations match, rather than whether the representations (expressions) of the elements of the pieces of assessment information match. For example, let us assume that the report "there is a risk of sudden explosion and therefore it is highly dangerous" has been made for a music player to be analyzed. Let us also assume that this report event has resulting in the standpoint "safety", which has not been adopted as a standpoint of evaluating music players in the past, and thereafter, the assessment information indicating that "safety" has been increased as the result of improving this music player has increased.

In this case, the assessment information appearing in the event-related documents is "risk", the assessment information appearing in the analysis subject documents resulting from the impact of this event is "safety", and the representations (expressions) do not math. However, both pieces of information describe an evaluation from the standpoint of being "safe" or "dangerous" resulting from this report event, and determining such examples as matching is more suitable for the purpose of the this embodiment.

One example of the method for performing such determination of a match between pieces of assessment information is a method in which a synonym processing technique is applied to elements used for determining a match between pieces of assessment information when performing the determination. Another example is a method in which normalization is performed for elements of assessment information that include a conjugated word, such as "evaluation expression" in the example shown in FIG. 2, by excluding dependent words appended to the conjugated word and changing the conjugated word back to its original form for the purpose of, for example, identifying an affirmative form with a negative form, or identifying different modalities. The element obtained by such normalization corresponds to "classification" in FIGS. 2 to 4. Furthermore, it is conceivable to use a method in which the analysis subject assessment information and the event assessment information are extracted using a common antonym dictionary that has been prepared in advance, and, if an element of one of the assessment information and an element of the other assessment information are in an antonymous relation, these elements are regarded as matching.

Further, in this embodiment, when selecting the common assessment information matching the event assessment information from the analysis subject assessment information, it is possible to assign weight the common assessment information in accordance with the number of times that the analysis subject assessment information match the common assessment information. The weight assigned in this way is used as a coefficient by the event impact analysis unit 100 described below for counting the number of times that the common assessment information appears in the analysis subject document.

The event impact analysis unit 100 focuses on the common assessment information selected by the common assessment information selection unit 90. Then, as described above, the event impact analysis unit 100 counts the number of times that the common assessment information appears in those of the analysis subject documents that have been created before the occurrence of the event of interest and the number of times that the common assessment information appears in those of the analysis subject documents that have been created after the occurrence of the event of interest. Further, in this embodiment, the event impact analysis unit 100 uses the result of the counting as an index representing the impact received by the analysis subject from the event of interest.

In this embodiment, the event impact analysis unit 100 receives, from the common assessment information selection unit 90, the common assessment information (or information for identifying the common assessment information) selected by the common assessment information selection unit 90. Then, each time the event impact analysis unit 100 detects assessment information that appears in the analysis subject document and that matches any one of the pieces of the common assessment information selected by the common assessment information selection unit 90, it counts the number of appearances of that assessment information.

Further, in this embodiment, when counting the common assessment information, the event impact analysis unit 100 can break down the common assessment information pieces that are to be counted into a plurality of groups, or putting them together in accordance with a preset classification criterion. For example, let us assume that the common assessment information selection unit 90 determines a match using the elements "evaluation subject", "attribute" and "evaluation expression" of the assessment information in the examples shown in FIGS. 2 to 4, and performs the selection of the common information. In this case, when performing counting, the event impact analysis unit 100 can divide the common assessment information into groups using the element "classification", which has been obtained as the result of normalization of the element "evaluation expression" of the assessment information.

For example, let us assume that common assessment information with the evaluation expression "safety" is present as the common assessment information. At this time, the common assessment information selection unit 90 determines that the assessment information (the evaluation expression "safety", the classification "negative") appearing in the analysis subject document and the assessment information (the evaluation expression "safety", the classification "positive") appearing in the event-related document match. Then, when performing counting, the event impact analysis unit 100 classifies the common assessment information into "negative" and "positive" using "classification". Thereafter, in accordance with the classification result of the common assessment information that is present, the event impact analysis unit 100 performs counting so as to increment the number of pieces of assessment information belonging to the "negative" group by 1 or increment the number of pieces of assessment information belonging to the "positive" group by 1.

In this embodiment, the classification criterion for dividing the common assessment information detected from the analysis subject document into groups can be appropriately set in advance according to the application and purpose in the use of the document analysis device 1 of this embodiment. For example, let us assume that pieces of assessment information are present for a product, and they include "classification" represented as "function" or "price" as their element. In this case, the event impact analysis unit 100 counts the number of appearances of the common assessment information for each of the groups defined by "classification". Consequently, whether the number of assessments regarding "function" has increased or decreased after the event of interest and whether the number of assessments regarding "price" has increased or decreased after the event of interest are presented to the user, and the user can analyze the impact on the product by the event in a more simplified manner.

Further, the event impact analysis unit 100 can determine whether the analysis subject document was created before the occurrence of the event or after the occurrence of the event using the time information added to each analysis subject document. Moreover, in this embodiment, it is preferable that the length of the period before and after the occurrence of the event during which the appearances of the common assessment information are to be examined and counted from the analysis subject document is previously defined as a separate parameter when using the document analysis device 1 of this embodiment. Note that the event occurrence time that has been input by the event input unit 60 can be used as the time information for identifying whether the analysis subject document was created before the occurrence of the event or after the occurrence of the event.

Figure 6:
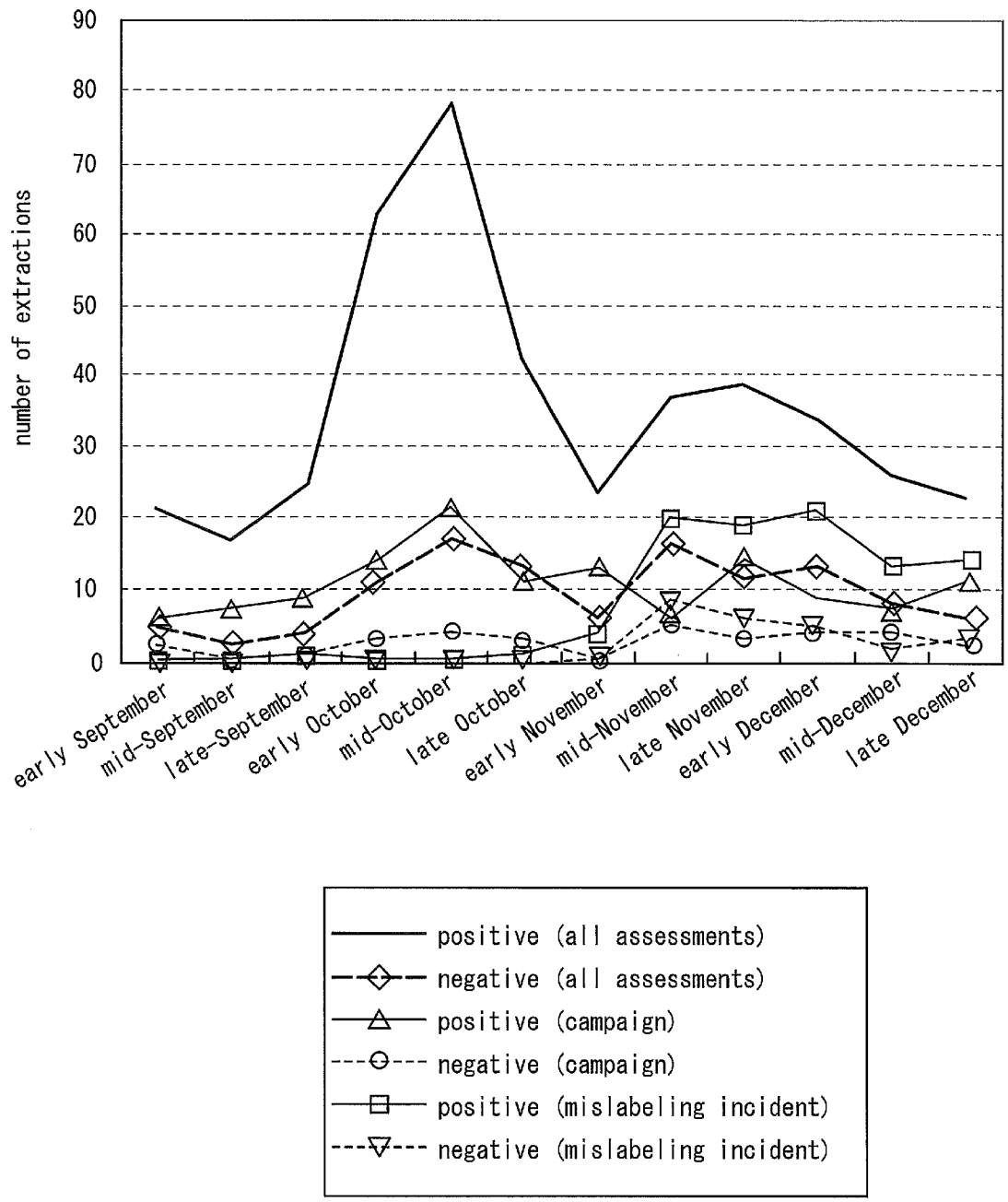
FIG. 6 is a graph representing the transition of the number of appearances of assessment information before and after the occurrence of an event.

An example of counting the common assessment information when the assessment information shown in the examples in FIGS. 2 to 4 will now be described with reference to FIG. 6. FIG. 6 is a graph showing the transition of the number of appearances of the assessment information before and after the occurrence of the event. As shown in FIG. 6, in this example, the counting of the common assessment information is performed, with the assessment information included in the analysis subject documents divided into "positive" groups and "negative" groups. In FIG. 6, the vertical axis of the graph represents the number of appearances of the assessment information for each time point and the horizontal axis of the graph represents the time. The meanings of the polygonal lines on the graph shown in FIG. 6 are as follows.

In FIG. 6, "solid line without any mark" indicates the counting results obtained without the use of this embodiment, showing the counting results for all the assessment information in which the classification included in the analysis subject document is "positive". "Broken line with diamond marks" indicates the counting results obtained without the use of this embodiment, showing the counting results for all the assessment information in which classification included in the analysis subject document is "negative".

In FIG. 6, "solid line with triangle marks" indicates the counting results for the common assessment information that has been obtained from the event-related document regarding "steamed dumplings campaign" and in which the classification is "positive". "broken line with circle marks" indicates the counting results for the common assessment information that has been obtained from the event-related document regarding "steamed dumplings campaign" and in which the classification is "negative".

In FIG. 6, "solid line with square marks" indicates the counting results for the common assessment information that has been obtained from the event-related document regarding "dumplings country-of-origin mislabeling incident" and in which the classification is "positive". "Broken line with inverted triangle marks" indicates the counting results for the common assessment information that has been obtained from the event-related document regarding "dumplings country-of-origin mislabeling incident" and in which the classification is "negative".

In the example shown in FIG. 6, from the graph ("solid line without any mark", "broken line with diamond marks") obtained without using this embodiment, it can be seen that the change in the assessment information caused by the event "steamed dumplings campaign," which occurred in early October is greater than the change in the assessment information caused by the event "dumplings country-of-origin mislabeling incident", which occurred in mid-November.

As described using the example in FIG. 3, much of the assessment information extracted from the event-related documents regarding "steamed dumplings campaign" is assessment information on the event itself. Also, much of the assessment information that has increased in the analysis subject document can be considered to be assessment information on the event itself. On the other hand, much of the assessment information that has increase by the event "dumplings country-of-origin mislabeling incident" is assessment information directly relating to "steamed dumplings," which is the analysis subject.

In this embodiment, the analysis subject assessment information that matches the event assessment information appearing in the event-related document is counted, and therefore the above-described tendency also appears in the graph shown in FIG. 6. As shown in FIG. 6, the event "steamed dumplings campaign", the common assessment information obtained from the event-related document regarding "dumplings country-of-origin mislabeling incident" has not significantly varied both in the positive case and the negative case before and after the occurrence of the event "steamed dumplings campaign". However, as shown in FIG. 6, it can be seen that the common assessment information obtained from the event-related document regarding "dumplings country-of-origin mislabeling incident" has significantly increased due to the event "dumplings country-of-origin mislabeling incident", particularly in the case of positive.

The analysis results obtained by the event impact analysis unit 100 of the document analysis device 1 will now be described with reference to FIG. 7. FIG. 7 shows an example of the analysis results obtained by the document analysis device according to an embodiment of the present invention. FIG. 7 shows the counting results for the positive assessment information and negative assessment information obtained during separate one-month periods before and after each event in the case shown in FIG. 6. In FIG. 7, "all evaluation expressions" indicates the counting results obtained without the use of this embodiment, and corresponds to "solid line without any mark" and "broken line with diamond marks" in FIG. 6. Further, in FIG. 7, "selected evaluation expression only" indicates the counting results obtained from the selected common assessment information.

As shown in FIG. 7, using the counting results, the event impact analysis unit 100 can calculate not only simple counting results, but also numerical values indicating the appearance tendency of the common assessment information, such as the difference between the pre-event results and the post-event results and the scale factor of the counting results obtained after the occurrence of the event relative to the counting results obtained before the occurrence of the event. In this case, the event impact analysis unit 100 can output not only simple counting results, but also the numerical values indicating the appearance tendency of the common assessment information as the index indicating the degree of impact of the event on the analysis subject.

Moreover, the event impact analysis unit 100 can also normalize the counting results using the number of analysis subject documents and the expected value of appearances of the assessment information in the analysis subject document, and calculate the probability of appearance of the assessment information that is counted for each group before and after the occurrence of the event. In this case, the event impact analysis unit 100 can output not only simple counting results, but also the probability of appearance as the indicating the degree of impact of the event on the analysis subject.

Note that, in this embodiment, the index indicating the impact that the event has on the analysis subject and the method for calculating the index are not limited to the examples described above. The index indicating the impact that the event has on evaluations of the analysis subject can also be calculated using any method used in a time series analysis technique in the field of statistics.

The impact output unit 110 outputs, to an external output means, the index indicating the impact of the event on the analysis subject that has been derived by the event impact analysis unit 100. Examples of the specific output means (not shown) to which the index is to be output include electronic devices such as a display device, a printer, and another computer connected via a network. In this embodiment, an optimum output means is selected from these output means in accordance with, for example, the purpose of using the document analysis device 1.

Figure 8:
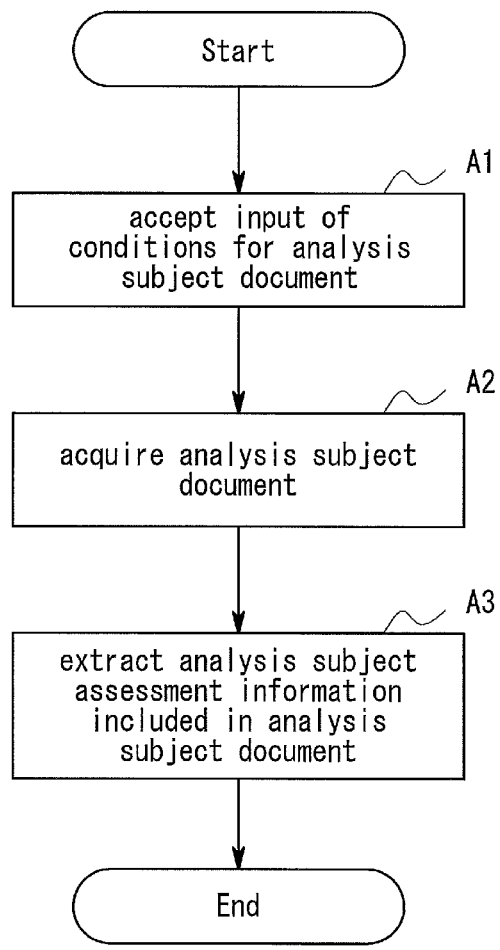
FIG. 8 is a flowchart illustrating a process for extracting the first assessment information according to an embodiment of the present invention.
Figure 9:
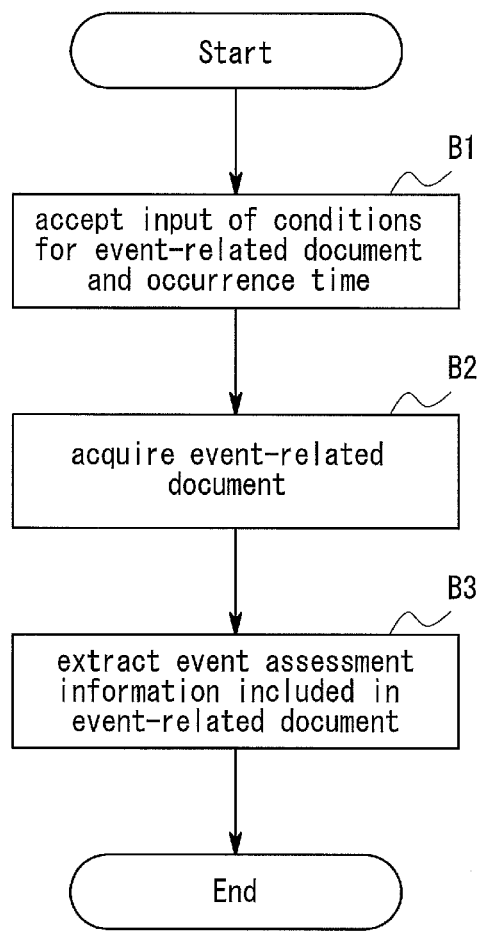
FIG. 9 is a flowchart illustrating a process for extracting the second assessment information according to an embodiment of the present invention.
Figure 10:
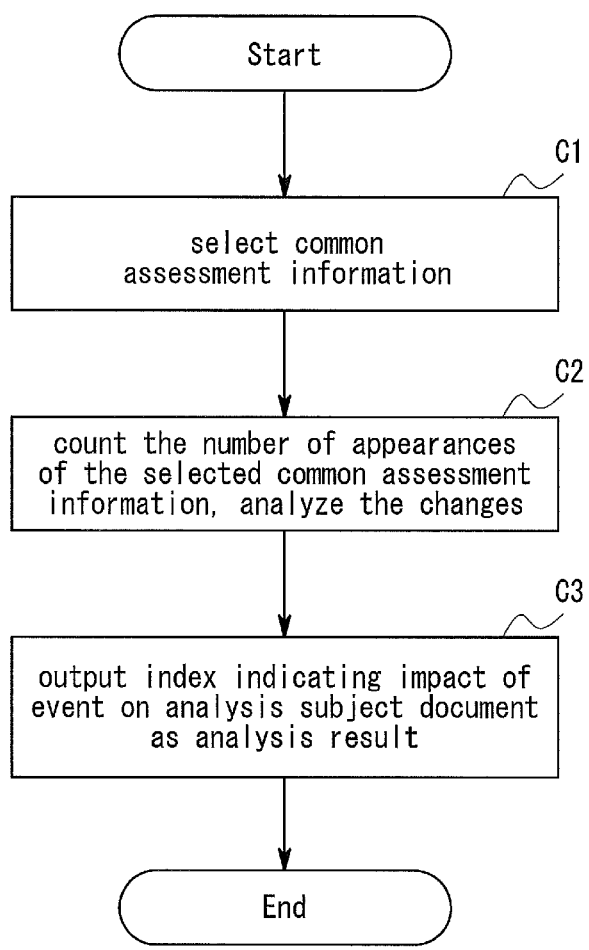
FIG. 10 is a flowchart illustrating a document analysis process according to an embodiment of the present invention.

Next, the operation of the document analysis device 1 according to an embodiment of the present invention will be described with reference to FIGS. 8 to 10. FIG. 8 is a flowchart illustrating a first assessment information extraction process of the embodiment of the present invention, and FIG. 9 is a flowchart illustrating a second assessment information extraction process according to the embodiment of the present invention. FIG. 10 is a flowchart illustrating a document analysis process according to the embodiment of the present invention. Note that, in the following description, reference will be made to FIGS. 1 to 7 as needed. Also, in this embodiment 1, a document analysis method is performed by operating the document analysis device 1. Accordingly, the description of the document analysis method in this embodiment 1 is substituted from the following description of the operation of the document analysis device 1.

First, the process for extracting the analysis subject assessment information will be described with reference to FIG. 8. As shown in FIG. 8, first, when the user has input a condition defining the analysis subject document from outside, the analysis subject input unit 10 accepts the condition that has been input (step A1). Then, the analysis subject document acquisition unit 20 acquires a set of analysis subject documents based on the accepted condition (step A2).

Next, the analysis subject assessment information extraction unit 40 extracts the assessment information (analysis subject document assessment information) from the analysis subject documents acquired in step A2 (step A3). Upon completion of steps A1 to A3, the process for extracting the analysis subject assessment information ends.

In step A3, as described in the description of the analysis subject assessment information extraction unit 40 above, it is possible to adopt a configuration in which the extraction of the assessment information is not performed for all of the documents belonging to the analysis subject document. More specifically, in step A3, those of the analysis subject documents that belong also to the event-related document may be excluded from the subjects to be extracted, and the extraction of the assessment information may be performed only for the remaining analysis subject documents. When such a process is performed, the analysis subject assessment information extraction unit 40 receives, in step A3, the information for identifying the event-related documents resulting from step B2, and excludes documents belonging to both the analysis subject documents and the event-related documents from the subjects of the assessment information extraction.

When the above-described exclusion process is performed in step A3, step B2 needs to end before step A3 is executed. However, except for this condition, the process for extracting the analysis subject assessment information and the process for extracting the event assessment information may be performed independently, or either of them may be performed first.

Note that when the analysis subject assessment information extraction unit 40 extracts the assessment information from the whole analysis subject documents, the condition that step B2 needs to end before execution of step A3 does not exist, and therefore the process for extracting the analysis subject assessment information and the process for extracting the event assessment information may be executed completely independently.

Next, the process for extracting the event assessment information will be described with reference to FIG. 9. As shown in FIG. 9, first, when the user has input a condition defining the event-related document and the occurrence time of the event from outside, the event input unit 60 accepts the condition and the occurrence time that have been input (step B1). Then, the event-related document acquisition unit 70 acquires a set of event-related documents based on the condition accepted by the event input unit 60 (step B2).

Next, the event assessment information extraction unit 80 extracts the assessment information (event assessment information) from the event-related documents acquired in step B2 (step B3). Upon completion of steps B1 to B3, the process for extracting the event assessment information ends.

Next, the document analysis processing will be described with reference to FIG. 10. Note that it is assumed that both the process for extracting the analysis subject assessment information and the process for extracting the event assessment information have already ended before execution of the document analysis process.

Alternatively, processes that are similar to these two processes may be executed separately, and results that are similar to those obtained by the two processes may be directly provided as an input of the document analysis process.

As shown in FIG. 10, first, the common assessment information selection unit 90 selects, from the analysis subject assessment information obtained by the process for extracting the analysis subject assessment information, the assessment information that matches the event assessment information obtained by the process for extracting the event assessment information (step C1). The assessment information selected in step C1 serves as the common assessment information.

Then, the event impact analysis unit 100 counts the number of times that the common assessment information appears in the analysis subject documents created (or originated) before the occurrence of the event and the number of times that the common assessment information appears in the analysis subject document created (or originated) after the occurrence of the event. Also, the event impact analysis unit 100 determines the obtained two counting results themselves or values calculated using the counting results as an index indicating the impact of the event on the analysis subject documents (step C2). The event impact analysis unit 100 outputs the index determined in step C2 to the impact output unit 100.

Thereafter, the impact output unit 100 outputs, to the outside, the index determined in step C2 in a format conforming to the application and the purpose in the use of the document analysis device 1 (step C3). Upon completion of execution of step C3, all the processes in the document analysis device 1 end.

As described thus far, according to this embodiment, the temporal transition of the assessment information included in the analysis subject document is extracted in order to measure the impact received by the analysis subject from the event in which the user is interested. However, at that time, the temporal transition of the assessment information resulting from another and assessment information that relates to the event itself but is irrelevant to the evaluation and assessment of the analysis subject is excluded. Therefore, according to this embodiment, it is possible to accurately analyze the impact received by the analysis subject document from the event as described above.

A program according to an embodiment of the present invention may be a program that causes a computer to execute step A1 to A3 shown in FIG. 8, steps B1 to B3 shown in FIG. 9, and steps C1 to C3 shown in FIG. 10. The document analysis device 1 and the document analysis method according to this embodiment can be implemented by installing this program in a computer and executing the program. In this case, the CPU (Central Processing Unit) of the computer functions as the analysis subject input unit 10, the analysis subject document acquisition unit 20, the analysis subject assessment information extraction unit 40, the event input unit 60, the event-related document acquisition unit 70, the event assessment information extraction unit 80, the common assessment information selection unit 90, the event impact analysis unit 100, and the impact output unit 110, and executes the processes.

In this embodiment, the document database 30 and the evaluation expression dictionary 50 can be implemented by storing, in storage devices provided in the computer, such as a hard disk, data files constituting the storage devices. Note that the storage devices for implementing the document database 30 and the evaluation expression dictionary 50 may be provided in a computer different from the computer executing the program according to this embodiment.

Figure 11:
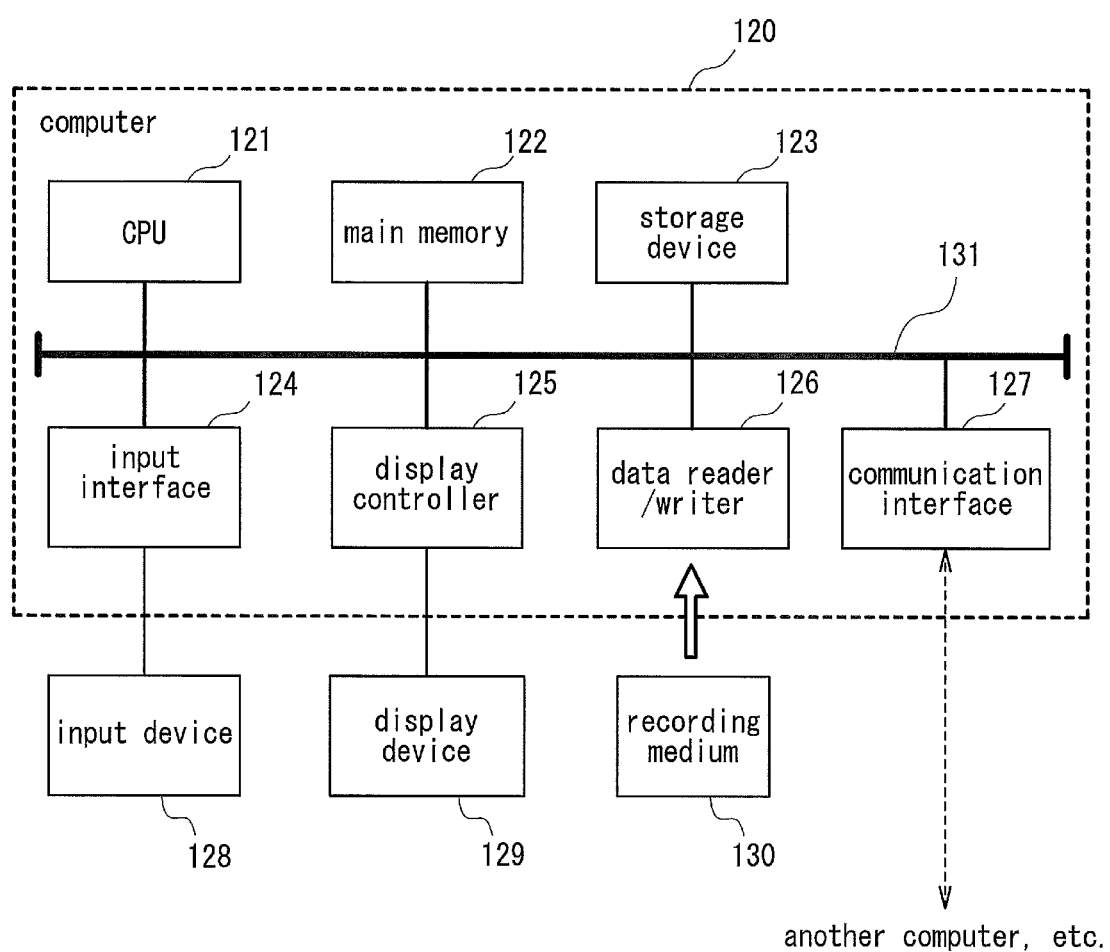
FIG. 11 is a block diagram showing a computer capable of executing a program according to an embodiment of the present invention.

The computer implementing the document analysis device by executing the program according to the embodiment will now be described with reference to FIG. 11. FIG. 11 is a block diagram showing a computer capable of executing the program according to the embodiment of the present invention.

As shown in FIG. 11, a computer 120 includes a CPU 121, a main memory 122, a storage device 123, an input interface 124, a display controller 125, a data reader/writer 126, and a communication interface 127. These components are connected so as to be capable of data communication with each other via a bus 131.

The CPU 121 carries out various processes by loading, into the main memory 122, the program (code) of this embodiment that is stored in the storage device 123 and executing the program in a predetermined order. Typically, the main memory 122 is a volatile storage device such as a DRAM (Dynamic Random Access Memory). The program according to this embodiment is provided in a state in which it is stored in a computer readable recording medium 130. Note that the program according to this embodiment may be distributed on the Internet connected via the communication interface 127.

Specific examples of the storage device 123 include, in addition to a hard disk, a semiconductor storage device such as a flash memory. The input interface 124 mediates the data transfer between the CPU 121 and an input device 128 such as a keyboard or a mouse. The display controller 125 is connected to a display device 129, and controls display performed by the display device 129. The data reader/writer 126 mediates the data transfer between the CPU 121 and the recording medium 130, and performs reading of the program from the recording medium 130 and writing of the processing results into the recording medium 130. The communication interface 127 mediates the data transfer between the CPU 121 and another computer.

Specific examples of the recording medium 130 include general-purpose semiconductor storage devices such as a CF (Compact Flash) and an SD (Secure Digital), magnetic recording mediums such as a flexible disk, and optical recording mediums such as a CD-ROM (Compact Disk Read Only Memory).

While a part or whole of the above-described embodiment can be expressed by (Appendix 1) to (Appendix 24) described below, the invention is not limited to the following description.

(Appendix 1)

A document analysis device for analyzing an impact of a specific event on an analysis subject, comprising:

a common assessment information selection unit that identifies, from among first assessment information appearing in an analysis subject document containing a description relating to an analysis subject, information that matches second assessment information appearing in an event-related document containing a description relating to the designated event, and selecting the identified information as common assessment information; and an event impact analysis unit that separately counts the number of times that the common assessment information appears in the analysis subject document created before the occurrence of the event and the number of times that the common assessment information appears in the analysis subject document created after the occurrence of the event, and deriving an index representing the impact based on results of the counting.

(Appendix 2)

The document analysis device according to Appendix 1, wherein the first assessment information includes an evaluation made by an author contained in the analysis subject document, and the second assessment information includes an evaluation made by an author contained in the event-related document.

(Appendix 3)

The document analysis device according to Appendix 2, wherein the first assessment information and the second assessment information each include, as elements thereof, at least a subject of the evaluation, an attribute of the evaluation, and an expression representing the evaluation, and, the common assessment information selection unit selects the common information by determining that the first assessment information matches the second assessment information if at least one of the following conditions is satisfied: the subjects respectively included in the first assessment information and the second assessment information match;

the attributes respectively included in the first assessment information and the second assessment information match; and expressions obtained by performing normalization for the expressions respectively included in the first assessment information and the second assessment information in a state in which dependent words have been excluded and a conjugated word is changed back to its original form either match or one of said expressions is antonymous to the other.

(Appendix 4)

The document analysis device according to Appendix 2 or 3, further comprising:

an analysis subject assessment information extraction unit that extracts, from the analysis subject document, a portion describing an evaluation made by the author of the analysis subject document, as the first assessment information; and an event assessment information extraction unit that extracts, from the event-related document, a portion describing an evaluation made by the author of the event-related document, as the second assessment information, wherein the analysis subject assessment information extraction unit extracts the first assessment information, excluding a document included in the analysis subject document that also corresponds to the event-related document.

(Appendix 5)

The document analysis device according to any one of Appendices 2 to 4, the event impact analysis unit divides the common assessment information appearing in the analysis subject document into groups in accordance with a preset classification criterion, and, separately counts, for each of the groups, the number of times that the common assessment information belonging to the group appears in the analysis subject document created before the occurrence of the event, and the number of times that the common assessment information belonging to the group appears in the analysis subject document created after the occurrence of the event.

(Appendix 6)

The document analysis device according to Appendix 5, wherein the event impact analysis unit divides the common assessment information appearing in the analysis subject document into groups including a group in which the evaluation made by the author contained in the analysis subject document is a positive evaluation and a group in which the evaluation made by the author contained in the analysis subject document is a negative evaluation.

(Appendix 7)

The document analysis device according to any one of Appendices 1 to 6, wherein the event impact analysis unit derives values obtained by the counting as an index representing the impact.

(Appendix 8)

The document analysis device according to any one of Appendices 1 to 6, wherein the event impact analysis unit derives the probability of appearance of the common assessment information or a numerical value indicating the appearance tendency of the common assessment information as an index representing the impact, using results of the counting.

(Appendix 9)

A method for analyzing an impact of a specific event on an analysis subject, including the steps of:

(a) identifying, from among first assessment information appearing in an analysis subject document containing a description relating to an analysis subject, information that matches second assessment information appearing in an event-related document containing a description relating to the designated event, and selecting the identified information as common assessment information; and (b) separately counting the number of times that the common assessment information appears in the analysis subject document created before the occurrence of the event and the number of times that the common assessment information appears in the analysis subject document created after the occurrence of the event, and deriving an index representing the impact based on results of the counting.

(Appendix 10)

The document analysis method according to Appendix 9, wherein the first assessment information includes an evaluation made by an author contained in the analysis subject document, and the second assessment information includes an evaluation and a value judgment made by an author contained in the event-related document.

(Appendix 11)

The document analysis method according to Appendix 10, wherein the first assessment information and the second assessment information each include, as elements thereof, at least a subject of the evaluation, an attribute of the evaluation, and an expression used for the evaluation, and, in the step (a), the common information is selected by determining that the first assessment information matches the second assessment information if at least one of the following conditions is satisfied:

the subjects respectively included in the first assessment information and the second assessment information match;

the attributes respectively included in the first assessment information and the second assessment information match; and expressions obtained by performing normalization for the expressions respectively included in the first assessment information and the second assessment information in a state in which dependent words have been excluded and a conjugated word is changed back to its original form either match or one of said expressions is antonymous to the other.

(Appendix 12)

The document analysis method according to Appendix 10 or 11, further comprising the steps of:

(c) extracting, from the analysis subject document, a portion describing an evaluation made by the author of the analysis subject document, as the first assessment information; and (d) extracting, from the event-related document, a portion describing an evaluation made by the author of the event-related document, as the second assessment information, wherein the steps (c) and (d) are executed before execution of the steps (a) and (b), and, in the step (c), the first assessment information is extracted, excluding a document included in the analysis subject document that also corresponds to the event-related document.

(Appendix 13)

The document analysis method according to any one of Appendices 10 to 12, wherein, in the step (b), the common assessment information appearing in the analysis subject document are divided into groups in accordance with a preset classification criterion, and, for each of the groups, the number of times that the common assessment information belonging to the group appears in the analysis subject document created before the occurrence of the event, and the number of times that the common assessment information belonging to the group appears in the analysis subject document created after the occurrence of the event are separately counted.

(Appendix 14)

The document analysis method according to Appendix 13, wherein, in the step (b), the common assessment information appearing in the analysis subject document is divided into groups including a group in which the evaluation made by the author contained in the analysis subject document is a positive evaluation and a group in which the evaluation made by the author contained in the analysis subject document is a negative evaluation.

(Appendix 15)

The document analysis method according to any one of Appendices 9 to 14, wherein, in the step (b), values obtained by the counting are derived as an index representing the impact.

(Appendix 16)

The document analysis method according to any one of Appendices 9 to 14, wherein, in the step (b), the probability of appearance of the common assessment information or a numerical value indicating the appearance tendency of the common assessment information is derived as an index representing the impact, using results of the counting.

(Appendix 17)

A computer readable recording medium having recorded thereon a program for analyzing, with a computer, an impact of a specific event on an analysis subject, the program including instructions for causing the computer to execute the steps of (a) identifying, from among first assessment information appearing in an analysis subject document containing a description relating to an analysis subject, information that matches second assessment information appearing in an event-related document containing a description relating to the designated event, and selecting the identified information as common assessment information; and (b) separately counting the number of times that the common assessment information appears in the analysis subject document created before the occurrence of the event and the number of times that the common assessment information appears in the analysis subject document created after the occurrence of the event, and deriving an index representing the impact based on results of the counting.

(Appendix 18)

The computer readable recording medium according to Appendix 17, wherein the first assessment information includes an evaluation made by an author contained in the analysis subject document, and the second assessment information includes an evaluation and a value judgment made by an author contained in the event-related document.

(Appendix 19)

The computer readable recording medium according to Appendix 18, wherein the first assessment information and the second assessment information each include, as elements thereof, at least a subject of the evaluation, an attribute of the evaluation, and an expression used for the evaluation, and, in the step (a), the common assessment information is selected by determining that the first assessment information matches the second assessment information if at least one of the following conditions is satisfied:

the subjects respectively included in the first assessment information and the second assessment information match;

the attributes respectively included in the first assessment information and the second assessment information match; and expressions obtained by performing normalization for the expressions respectively included in the first assessment information and the second assessment information in a state in which dependent words have been excluded and a conjugated word is changed back to its original form either match or one of said expressions is antonymous to the other.

(Appendix 20)

The computer readable recording medium according to Appendix 18 or 19, further causing the computer to execute, before execution of the steps (a) and (b), the steps of:

(c) extracting, from the analysis subject document, a portion describing an evaluation made by the author of the analysis subject document, as the first assessment information; and (d) extracting, from the event-related document, a portion describing an evaluation made by the author of the event-related document, as the second assessment information, wherein, in the step (c), the first assessment information is extracted, excluding a document included in the analysis subject document that also corresponds to the event-related document.

(Appendix 21)

The computer readable recording medium according to any one of Appendices 18 to 20, wherein, in the step (b), the common assessment information appearing in the analysis subject document are divided into groups in accordance with a preset classification criterion, and, for each of the groups, the number of times that the common assessment information belonging to the group appears in the analysis subject document created before the occurrence of the event, and the number of times that the common assessment information belonging to the group appears in the analysis subject document created after the occurrence of the event are separately counted.

(Appendix 22)

The computer readable recording medium according to Appendix 21, wherein, in the step (b), the common assessment information appearing in the analysis subject document is divided into groups including a group in which the evaluation made by the author contained in the analysis subject document is a positive evaluation and a group in which the evaluation made by the author contained in the analysis subject document is a negative evaluation.

(Appendix 23)

The computer readable recording medium according to any one of Appendices 17 to 22, wherein, in the step (b), values obtained by the counting are derived as an index representing the impact.

(Appendix 24)

The computer readable recording medium according to any one of Appendices 17 to 22, wherein, in the step (b), the probability of appearance of the common assessment information or a numerical value indicating the appearance tendency of the common assessment information is derived as an index representing the impact, using results of the counting.

Although the present invention has been described above with reference to an embodiment, the invention is not limited to the above-described embodiment. Various modifications that can be understood by a person skilled in the art may be made to the configuration and the details of the present invention within the scope of the invention.

This application claims priority to Japanese Patent Application No. 2009-267266 filed on Nov. 25, 2009, the disclosure of which is incorporated in its entirety herein by reference.

INDUSTRIAL APPLICABILITY

The present invention is applicable to analysis of the market of a subject of interest using texts available on the Internet, such as blogs. The invention is also applicable to analysis of results of questionnaire surveys conducted periodically. For example, by analyzing the blogs containing descriptions relating to the analysis subject, the degrees of impact of multiple advertisements and campaigns that have been conducted for the analysis subject in the past can be examined, and they also can be ranked. The user can know which of the advertisements and campaigns were highly effective.

Furthermore, according to the present invention, it is possible to accurately examine the transition of the assessment information after the occurrence of the incident used as the analysis subject, and therefore it is possible to make analysis as to what kind of impact has occurred due to the occurrence of incidents in the past and at what degree. The user can also use the results of such analysis as a future reference when developing the policy for coping with sudden incidents.

DESCRIPTIONS OF REFERENCE NUMERALS

1 document analysis device
10 analysis subject input unit
20 analysis subject document acquisition unit
30 document database
40 analysis subject assessment information extraction unit
50 evaluation expression dictionary
60 event input unit
70 event-related document acquisition unit
80 event assessment information extraction unit
90 common assessment information selection unit
100 event impact analysis unit 110 impact output unit
120 computer
121 CPU
122 main memory
123 storage device
124 input interface
125 display controller
126 data reader/writer
127 communication interface
128 input device
129 display device
130 recording medium
131 bus

The invention claimed is:

1. A non-transitory computer readable recording medium having recorded thereon a program for analyzing, with a computer, an impact of a specific event on an analysis subject, the program comprising instructions for causing the computer to execute the steps of:
   (a) identifying, from among first assessment information appearing in an analysis subject document containing a description relating to an analysis subject, information that matches second assessment information appearing in an event-related document containing a description relating to the designated event, and selecting the identified information as common assessment information; and
   (b) separately counting the number of times that the common assessment information appears in the analysis subject document created before the occurrence of the event and the number of times that the common assessment information appears in the analysis subject document created after the occurrence of the event, and deriving an index representing the impact based on results of the counting;
   wherein the first assessment information includes an evaluation made by an author contained in the analysis subject document, and
      the second assessment information includes an evaluation and a value judgment made by an author contained in the event-related document.

2. The non-transitory computer readable recording medium according to claim 1,
   wherein the first assessment information and the second assessment information each include, as elements thereof, at least a subject of the evaluation, an attribute of the evaluation, and an expression used for the evaluation, and,
   in the step (a), the common information is selected by determining that the first assessment information matches the second assessment information if at least one of the following conditions is satisfied:
   the subjects respectively included in the first assessment information and the second assessment information match;
   the attributes respectively included in the first assessment information and the second assessment information match; and
   expressions obtained by performing normalization for the expressions respectively included in the first assessment information and the second assessment information in a state in which dependent words have been excluded and a conjugated word is changed back to its original form either match or one of said expressions is antonymous to the other.

3. The non-transitory computer readable recording medium according to claim 1 further causing the computer to execute, before execution of the steps (a) and (b), the steps of:
   (c) extracting, from the analysis subject document, a portion describing an evaluation made by the author of the analysis subject document, as the first assessment information; and
   (d) extracting, from the event-related document, a portion describing an evaluation made by the author of the event-related document, as the second assessment information,
   wherein, in the step (c), the first assessment information is extracted, excluding a document included in the analysis subject document that also corresponds to the event-related document.

4. The non-transitory computer readable recording medium according to claim 1,
   wherein, in the step (b),
   the common assessment information appearing in the analysis subject document are divided into groups in accordance with a preset classification criterion, and, for each of the groups, the number of times that the common assessment information belonging to the group appears in the analysis subject document created before the occurrence of the event, and the number of times that the common assessment information belonging to the group appears in the analysis subject document created after the occurrence of the event are separately counted.

5. The non-transitory computer readable recording medium according to claim 4,
   wherein, in the step (b),
   the common assessment information appearing in the analysis subject document is divided into groups including a group in which the evaluation made by the author contained in the analysis subject document is a positive evaluation and a group in which the evaluation made by the author contained in the analysis subject document is a negative evaluation.

6. The non-transitory computer readable recording medium according to claim 1,
   wherein, in the step (b), values obtained by the counting are derived as an index representing the impact.

7. The non-transitory computer readable recording medium according to claim 1,
   wherein, in the step (b), the probability of appearance of the common assessment information or a numerical value indicating the appearance tendency of the common assessment information is derived as an index representing the impact, using results of the counting.

8. A document analysis device for analyzing an impact of a specific event on an analysis subject, comprising:
   a common assessment information selection unit that identifies, from among first assessment information appearing in an analysis subject document containing a description relating to an analysis subject, information that matches second assessment information appearing in an event-related document containing a description relating to the designated event, and selecting the identified information as common assessment information; and
   an event impact analysis unit that separately counts the number of times that the common assessment information appears in the analysis subject document created before the occurrence of the event and the number of times that the common assessment information appears in the analysis subject document created after the occurrence of the event, and deriving an index representing the impact based on results of the counting;
   wherein the first assessment information includes an evaluation made by an author contained in the analysis subject document, and
   the second assessment information includes an evaluation made by an author contained in the event-related document.

9. The document analysis device according to claim 8,
wherein the first assessment information and the second assessment information each include, as elements thereof, at least a subject of the evaluation, an attribute of the evaluation, and an expression representing the evaluation, and, the common assessment information selection unit selects the common information by determining that the first assessment information matches the second assessment information if at least one of the following conditions is satisfied:

the subjects respectively included in the first assessment information and the second assessment information match;

the attributes respectively included in the first assessment information and the second assessment information match; and expressions obtained by performing normalization for the expressions respectively included in the first assessment information and the second assessment information in a state in which dependent words have been excluded and a conjugated word is changed back to its original form either match or one of said expressions is antonymous to the other.

10. The document analysis device according to claim 8, further comprising:

an analysis subject assessment information extraction unit that extracts, from the analysis subject document, a portion describing an evaluation made by the author of the analysis subject document, as the first assessment information; and an event assessment information extraction unit that extracts, from the event-related document, a portion describing an evaluation made by the author of the event-related document, as the second assessment information, wherein the analysis subject assessment information extraction unit extracts the first assessment information, excluding a document included in the analysis subject document that also corresponds to the event-related document.

11. The document analysis device according to claim 8, the event impact analysis unit divides the common assessment information appearing in the analysis subject document into groups in accordance with a preset classification criterion, and, separately counts, for each of the groups, the number of times that the common assessment information belonging to the group appears in the analysis subject document created before the occurrence of the event, and the number of times that the common assessment information belonging to the group appears in the analysis subject document created after the occurrence of the event.

12. The document analysis device according to claim 11, wherein the event impact analysis unit divides the common assessment information appearing in the analysis subject document into groups including a group in which the evaluation made by the author contained in the analysis subject document is a positive evaluation and a group in which the evaluation made by the author contained in the analysis subject document is a negative evaluation.

13. The document analysis device according to claim 8, wherein the event impact analysis unit derives values obtained by the counting as an index representing the impact.

14. The document analysis device according to claim 8, wherein the event impact analysis unit derives the probability of appearance of the common assessment information or a numerical value indicating the appearance tendency of the common assessment information as an index representing the impact, using results of the counting.

15. A method for analyzing an impact of a specific event on an analysis subject, comprising the steps of:

(a) identifying by a computer, from among first assessment information appearing in an analysis subject document containing a description relating to an analysis subject, information that matches second assessment information appearing in an event-related document containing a description relating to the designated event, and selecting the identified information as common assessment information; and (b) separately counting by the computer, the number of times that the common assessment information appears in the analysis subject document created before the occurrence of the event and the number of times that the common assessment information appears in the analysis subject document created after the occurrence of the event, and deriving by the computer, an index representing the impact based on results of the counting;

wherein:

the first assessment information includes an evaluation made by an author contained in the analysis subject document, and the second assessment information includes an evaluation and a value judgment made by an author contained in the event-related document.

16. The document analysis method according to claim 15, wherein the first assessment information and the second assessment information each include, as elements thereof, at least a subject of the evaluation, an attribute of the evaluation, and an expression used for the evaluation, and, in the step (a), the common information is selected by determining that the first assessment information matches the second assessment information if at least one of the following conditions is satisfied:

the subjects respectively included in the first assessment information and the second assessment information match;

the attributes respectively included in the first assessment information and the second assessment information match; and expressions obtained by performing normalization for the expressions respectively included in the first assessment information and the second assessment information in a state in which dependent words have been excluded and a conjugated word is changed back to its original form either match or one of said expressions is antonymous to the other.

17. The document analysis method according to claim 15, further comprising the steps of:

(c) extracting by the computer, from the analysis subject document, a portion describing an evaluation made by the author of the analysis subject document, as the first assessment information; and (d) extracting by the computer, from the event-related document, a portion describing an evaluation made by the author of the event-related document, as the second assessment information, wherein:

the steps (c) and (d) are executed before execution of the steps (a) and (b), and, in the step (c), the first assessment information is extracted, excluding a document included in the analysis subject document that also corresponds to the event-related document.

18. The document analysis method according to claim 15, wherein, in the step (b),
the common assessment information appearing in the analysis subject document are divided into groups in accordance with a preset classification criterion, and, for each of the groups, the number of times that the common assessment information belonging to the group appears in the analysis subject document created before the occurrence of the event, and the number of times that the common assessment information belonging to the group appears in the analysis subject document created after the occurrence of the event are separately counted.

19. The document analysis method according to claim 18, wherein, in the step (b),
the common assessment information appearing in the analysis subject document is divided into groups including a group in which the evaluation made by the author contained in the analysis subject document is a positive evaluation and a group in which the evaluation made by the author contained in the analysis subject document is a negative evaluation.

20. The document analysis method according to claim 15, wherein, in the step (b), values obtained by the counting are derived as an index representing the impact.

21. The document analysis method according to claim 15, wherein, in the step (b), the probability of appearance of the common assessment information or a numerical value indicating the appearance tendency of the common assessment information is derived as an index representing the impact, using results of the counting.

* * * * *